G. W. BOWEN.
RATCHET GREASE CUP.
APPLICATION FILED AUG. 26, 1910.
997,176.
Patented July 4, 1911.
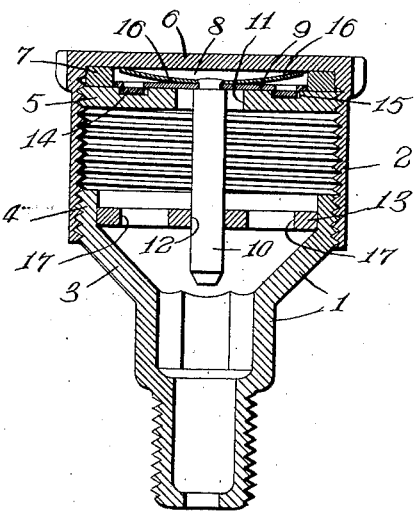
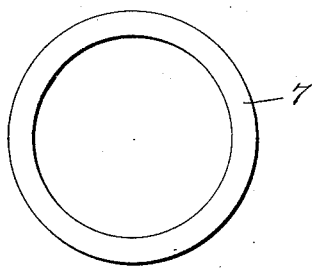
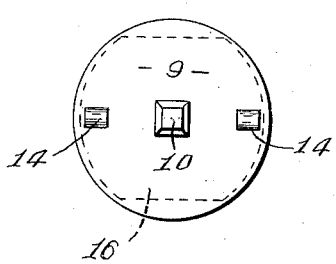
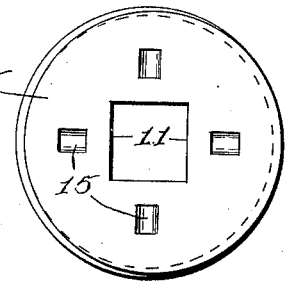
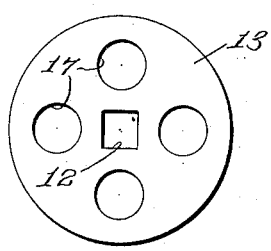
WITNESSES:
INVENTOR
George W. Bowen
BY
Parsons Hall Bodell
ATTORNEYS

UNITED STATES PATENT OFFICE.

GEORGE W. BOWEN, OF AUBURN, NEW YORK.

RATCHET GREASE-CUP.

997,176. Specification of Letters Patent. Patented July 4, 1911.

Application filed August 26, 1910. Serial No. 579,093.

*To all whom it may concern:*

Be it known that I, GEORGE W. BOWEN, of Auburn, in the county of Cayuga and State of New York, have invented a new and useful Ratchet Grease-Cup, of which the following is a specification.

My invention relates to grease cups and has for its object a ratchet grease cup which is particularly simple in construction, economical in manufacture and highly efficient in use; and it consists in the combinations and constructions hereinafter set forth and claimed.

In describing this invention reference is had to the accompanying drawings in which like characters designate corresponding parts in all the views.

Figure 1 is a vertical sectional view of my grease cup. Figs. 2, 3 and 4 are detail views of parts thereof. Fig. 5 is a detail view of the diaphragm or holding disk in the base of the grease cup.

1 is the base, and 2 is the cap of this grease cup, said parts being usually stamped from sheet metal. Preferably the base comprises a funnel-shape body 3 having an upturned cylindrical flange 4 which is externally threaded, and the cap is formed with an imperforate head and with an internal thread turing on the threaded portion of the base, said internal thread terminating short of the inner face of the imperforate head.

5 is a disk fixed within the cap, this disk being preferably stamped from sheet metal and having a threaded edge coacting with the internal thread of the cap and being screwed into the cap toward the head 6 of the cap.

7 is an abutment ring which is interposed between the inner face of the head 6 and the margin of the disk 5 and limits the inward movement of the disk 5, and together with said disk and the inner face of the head 6 confines a chamber 8. The ring 7 is thus fixed in the cap as turning of the cap on the base to compress the grease in the cup serves to more tightly jam the disk against the abutment ring 7, and the spring, to be described, of the ratchet mechanism of the disks 5 and 9 is not sufficiently strong to lock the coacting disks of such mechanism together and cause the cap to turn relatively to the disk 5 when the cap is being unscrewed.

9 is a ratchet disk located within, and formed of substantially the same diameter as the chamber 8 formed by the disk 5, ring 7, and the inner face of the head 6 of the cap, said disk 9 being movable in the chamber 8 independently of the cap 2 lengthwise of the axis of said cap and coacting with an axial non-circular stem 10 extending through a non-circular opening 11 in the disk 5, and of greater diameter than the stem 10, the stem being spaced apart from the inclosing wall of the opening 11 and fitting a non-circular opening 12 in a diaphragm or holding disk 13 fixed in the base 1 and usually within the upturned cylindrical flange of the body portion of the base. The stem 10 is held by the disk 13 from turning movement with the cap and holds the disk 9 from such turning movement. Said stem 10 is preferably formed with a shoulder 110 engaging the outer face of the disk 9, and with a reduced inner end extending through and projecting inwardly beyond said disk 9. Preferably the lower end of the stem 10 is pointed for facilitating its entrance into the opening 12, and said lower end projects sufficiently beneath the edge of the open end of the cap so that said stem enters the opening 12 and centers the cap before it engages the flange 4 of the base. Opposing faces of the disks 5 and 9 are provided respectively with coacting projections 14 and depressions 15 forming ratchet means. The disks 5, and 9 are pressed toward each other by a leaf spring 16 rigidly mounted on the upper face of the disk 9, the central portion of the spring 16 being spaced apart from the inner face of the head 6 of the cap 2 and bearing against the inner or opposing surface of the central portion of the disk 9 and the shoulder 110, and having an opening which receives the extremity of the reduced end of the stem 10, and said extremity being riveted upon the contiguous or inner face of the spring 16. Said spring 16 is discoidal and curved out of a plane and its spaced apart ends bear against the inner face of the head 6 of the cap.

The diaphragm or holding disk 13 is formed with perforations 17 therein for permitting the grease to pass from the cap through the base, these perforations 17 being spaced apart from, that is not communicating with, the central opening 12 of the holding disk.

In operation the cap is held in its adjusted position and from being accidentally turned by vibrations or other conditions by the fact that the engaging means 14 and 15 are held in engagement with sufficient force to prevent accidental turning of the cap. The construction of the ratchet mechanism herein described is particularly advantageous in that all the parts can be stamped out of sheet metal and no grooving or other machining of the parts or of the base or cap other than threading and riveting is necessary, as the projections and depressions on the ratchet disks are formed while said disks are being stamped out.

It will be noted that the disk 9 is supported on the disk 5, that the disk 9 supports the stem 10 and the spring 16, that these parts 9, 10 and 16 are united together and when secured together, as shown, are assembled in position by passing the stem 10 through the opening 11 in the disk 5 and screwing said disks 5 within the cap 2 against the abutment ring 7, and that when the parts 9, 10 and 16 are assembled within the cap, said parts 9 and 10 move together whenever the disk 9 is forced in one direction against the spring 16, or in the opposite direction by such spring. It will also be noted that my present invention does not necessitate a particular construction of cap, but, on the contrary, uses a well known form of cap and merely requires that the ring 7, the disk 5, and the parts 9, 10 and 16 shall be assembled within such cap.

What I claim is:—

1. A grease cup comprising a base, a cap threading on the base and having an imperforate head, a disk fixed in the cap and having an opening therethrough, opposing surfaces of the head of the cap and the disk forming opposite sides of a chamber in the cap, and mechanism for restraining turning of the cap including engaging means fixed within the cap, a second engaging means composed of a disk and a stem, the disk being supported within the chamber directly on the first named disk and coacting with the engaging means within the cap, said second named disk being formed of substantially the same diameter as the chamber, and the stem being supported by the disk of the second mentioned engaging means and being connected to the base and held thereby from turning movement with the cap, the stem being passed through the opening of the first named disk and spaced apart from the inclosing wall of said opening, and yielding means for effecting the coaction of said engaging means, substantially as described.

2. A grease cup comprising a base, a cap threading on the base and having an imperforate head, a disk fixed in the cap and having an opening therethrough, opposing surfaces of the head of the cap and the disk forming opposite sides of a chamber in the cap, and mechanism for restraining turning of the cap including engaging means provided on the disk within the chamber, a second engaging means composed of a disk and a stem fixed together, the disk being supported within the chamber directly on the first named disk and coacting with the engaging means on said first named disk, and the stem being passed through the opening of the first named disk and connected to the base and held by the base from turning movement with the cap, and yielding means for effecting the coaction of said engaging means, said yielding means being fixed to, and movable with, the second mentioned engaging means, substantially as described.

3. A grease cup comprising a base, a cap threading on the base and having an imperforate head, a disk fixed in the cap and having an opening therethrough, opposing surfaces of the head of the cap and the disk forming opposite sides of a chamber in the cap, and mechanism for restraining turning of the cap, including engaging means provided on the disk within the chamber, a second engaging means composed of a disk and a stem fixed together, the disk being supported within the chamber directly on the first named disk and coacting with the engaging means on said first named disk, said second named disk being formed of substantially the same diameter as the chamber, and the stem being connected to the base and held thereby from turning movement with the cap, the stem being passed through the opening of the first named disk and spaced apart from the inclosing wall thereof, and a spring arranged between opposing surfaces of the head of the cap and the disk of the second mentioned engaging means and fixed to the second mentioned engaging means, substantially as described.

4. A grease cup comprising a base, a cap threading on the base and having an imperforate head, said cap having an internal thread terminating short of the inner face of the imperforate head, a peripherally threaded disk coacting with the internal thread of the cap and fixed in the cap and spaced apart from the inner face of the head thereof, the disk having an opening therethrough, an abutment ring formed of less diameter than the apices of the internal thread of the cap and interposed between the margin of the disk and the inner face of the imperforate head, and together with the head and the disk forming a chamber, and mechanism for restraining turning of the cap including engaging means provided on the disk within the chamber, a second engaging means composed of a disk and a stem fixed together, the disk being supported within the chamber directly on the first named disk and coacting with the engaging means on said first named disk, said second named disk being formed of substantially the same diameter as the chamber, and the stem being connected to the base and held thereby from turning movement with the cap, the stem being passed through the opening of the first named disk and spaced apart from the inclosing wall thereof, and a spring arranged between opposing surfaces of the head of the cap and the disk of the second mentioned engaging means and fixed to the second mentioned engaging means, substantially as described.

5. A grease cup comprising a base, a cap threading on the base and having an imperforate head, a disk fixed in the cap and having an opening therethrough, opposing surfaces of the head of the cap and the disk forming opposite sides of a chamber in the cap, and mechanism for restraining turning of the cap including engaging means fixed relatively to the cap within said chamber, a second engaging means composed of a part supported within the chamber directly upon the disk and coacting with the engaging means within the chamber, said part being formed of substantially the same diameter as the chamber, and a second part supported by the first named part and movable therewith and connected to the base and held thereby from turning movement with the cap, said second part being passed through the opening of the disk and spaced apart from the inclosing wall of said opening, and a spring fixed to the second mentioned engaging means and interposed between the imperforate head of the cap and the first named part of said second mentioned engaging means, substantially as described.

6. A grease cup comprising a base, a cap threading on the base and having an imperforate head, a disk fixed in the cap and having an opening therethrough, opposing surfaces of the head of the cap and the disk forming opposite sides of a chamber in the cap, and mechanism for restraining turning of the cap including engaging means fixed within the cap, a second engaging means composed of a disk and a stem, the disk being supported within the chamber directly on the first named disk and coacting with the engaging means within the cap, said second named disk being formed of substantially the same diameter as the chamber, and the stem being supported by the disk of the second mentioned engaging means and being connected to the base and held thereby from turning movement with the cap, the stem being passed through the opening of the first named disk and spaced apart from the inclosing wall of said opening, and a spring having a portion thereof engaged with the imperforate head, and a second portion thereof spaced apart from said head and fixed to the second mentioned engaging means, substantially as described.

7. A grease cup comprising a base, a cap threading on the base and having an imperforate head, a disk fixed in the cap and having an opening therethrough, opposing surfaces of the head of the cap and the disk forming opposite sides of a chamber in the cap, and mechanism for restraining turning of the cap including engaging means provided on the disk within the chamber, a second engaging means composed of a disk and a stem fixed together, the disk being supported within the chamber and on the first named disk and coacting with the engaging means on said first named disk, and the stem being passed through the opening of the first named disk and connected to the base and held by the base from turning movement with the cap, and a spring having opposite portions thereof engaged with the imperforate head and an intermediate portion thereof spaced apart from said head and clamped between opposing surfaces of the disk and the stem of the second mentioned engaging means, substantially as described.

8. A grease cup comprising a base, a cap threading on the base and having an imperforate head, a disk fixed in the cap and having an opening therethrough, opposing surfaces of the head of the cap and the disk forming opposite sides of a chamber in the cap, and mechanism for restraining turning of the cap including engaging means provided on the disk within the chamber, a second engaging means composed of a disk and a stem fixed together, the disk being supported within the chamber directly on the first-named disk and coacting with the engaging means on said first-named disk, and the stem being passed through the opening of the first-named disk and connected to the base and held by the base from turning movement with the cap, and a spring for effecting the coaction of said engaging means, the spring being fixed to the second-mentioned engaging means and having portions thereof spaced apart and coacting with the inner face of the imperforate head, substantially as and for the purpose described.

9. A grease cup comprising a base, a cap threading on the base and having an imperforate head, a disk fixed in the cap and having an opening therethrough, opposing surfaces of the head of the cap and the disk forming opposite sides of a chamber in the cap, and mechanism for restraining turning of the cap including engaging means provided on the disk within the chamber, a second engaging means composed of a disk and a stem fixed together, the disk being supported within the chamber directly on the first-named disk and coacting with the engaging means on said first-named disk, said second-named disk being formed of substantially the same diameter as the chamber, and the stem being connected to the base and held thereby from turning movement with the cap, the stem being passed through the opening of the first-named disk and spaced apart from the inclosing wall thereof, and a spring for effecting the coaction of said engaging means, the spring having portions thereof spaced apart and coacting with the inner face of the imperforate head, and having an additional portion interposed between the spaced apart portions thereof and fixed to said second-mentioned engaging means, substantially as and for the purpose specified.

10. In combination in a grease cup, a body, a cap having an imperforate head, a ratchet mechanism separate from said cap and secured therein, said ratchet mechanism including coöperating ratchet surfaces, a spring tending to force the same into engagement with each other, and a device coöperating with the grease cup body for holding one of said ratchet surfaces against rotation relatively to the other ratchet surface.

11. A grease cup comprising a body or base, a cap threaded on the body or base and having an imperforate head, a stem having an interlocking connection with the base, a ratchet member and a spring rigidly connected axially to the stem, and a disk detachably held in the cap and having a ratchet surface coöperating with said ratchet member.

12. In combination in a grease cup, a ratchet member, a spring and a retaining member permanently connected to one another, a base, means in the base coöperating with the retaining member for preventing the rotation thereof, a cap having an imperforate head and provided with a chamber for confining the ratchet member and said spring, said chamber having a wall removable independently of the retaining member, and said spring having portions engaging said head of the cap.

In testimony whereof, I have hereunto signed my name in the presence of two attesting witnesses, at Syracuse in the county of Onondaga in the State of New York, this 29 day of July 1910.

GEORGE W. BOWEN.

Witnesses:
  GEO. W. BENHAM,
  F. G. BODELL.

---

Copies of this patent may be obtained for five cents each, by addressing the "Commissioner of Patents, Washington, D. C."